United States Patent [19]

Lee et al.

[11] Patent Number: 4,912,762
[45] Date of Patent: Mar. 27, 1990

[54] MANAGEMENT OF CRYPTOGRAPHIC KEYS

[75] Inventors: Stephen G. Lee, Beckenham Kent; Peter R. Smith, Alresford, both of United Kingdom

[73] Assignee: International Business Machines Corporation, Armonk, N.Y.

[21] Appl. No.: 182,555

[22] Filed: Apr. 18, 1988

[30] Foreign Application Priority Data

Apr. 22, 1987 [EP] European Pat. Off. ........ 87303503.4

[51] Int. Cl.$^4$ .......................... H04L 9/00; G07F 7/10
[52] U.S. Cl. ........................................ 380/24; 380/29; 380/47; 380/49; 235/379; 235/380
[58] Field of Search .................................. 380/23–25, 380/28, 44, 47, 49, 29; 364/200, 900; 235/379, 380

[56] References Cited

U.S. PATENT DOCUMENTS

| | | | |
|---|---|---|---|
| 4,227,253 | 10/1980 | Ehrsam et al. | 380/25 X |
| 4,309,569 | 1/1982 | Merkle | 380/23 |
| 4,500,750 | 2/1985 | Elander et al. | 380/24 X |
| 4,605,820 | 8/1986 | Campbell, Jr. | 380/24 |
| 4,747,050 | 5/1988 | Brachtl et al. | 380/24 X |
| 4,755,940 | 7/1988 | Brachtl et al. | 380/24 X |
| 4,771,459 | 9/1988 | Jansen | 380/25 X |
| 4,771,461 | 9/1988 | Matyas | 380/24 |

FOREIGN PATENT DOCUMENTS 0002655  9/1981  PCT Int'l Appl. .

OTHER PUBLICATIONS

IBM Technical Disclosure Bulletin, vol. 24, No. 1B, Jun. 1981, pp. 561–565, New York, U.S.; R. E. Lennon et al.: "Application for Personal Key Crypto with Insecure Terminals": p. 562, lines 1–8, p. 563, lines 5–21; p. 565, lines 9–11.

IBM Technical Disclosure Bulletin, vol. 22, No. 2, Jul. 1979, pp. 643–646, New York, U.S.; R. E. Lennon et al.: "Composite Cryptographic Session Keys for Enhanced Communication Security", p. 643, line 1–p. 644, line 15.

Systems–Computers–Controls, vol. 13, No. 6, Nov./Dec. 1982, pp. 36–44, Scripta Publishing Co., Silver Spring, Md., U.S.; T. Matsumoto et al.: "Directly Transformed Link Encryption", p. 38, left-hand column, line 6.

IBM Technical Disclosure Bulletin, vol. 22, No. 2, Jul. 1979, pp. 636–639, New York, U.S.; R. E. Lennon et al.: "Cryptographic Key Distribution for Terminal Communications", p. 637, lines 3–42.

Primary Examiner—Stephen C. Buczinski
Assistant Examiner—Bernarr Earl Gregory
Attorney, Agent, or Firm—John E. Hoel

[57] ABSTRACT

A method for simplifying key management in situations where unique cryptographic keying relationships are required end-to-end between pairs of parties and a symmetric encryption algorithm is to be used. It is useful in cases where the parties come from disjoint subsets of the total population of parties. The method provides some of the characteristics of a public key crypto system (PKS) utilizing the public identities of the parties as part of the key, but lacks the property of PKS which allows a party to independently generate a secret key which is known only to that party.

13 Claims, 2 Drawing Sheets

MANAGEMENT OF CRYPTOGRAPHIC KEYS

Background of the Invention

1. Technical Field

The invention relates a method of and apparatus for encoding messages in a communication network in which a first set of nodes transmits and receives messages to and from a second set of nodes, each of the nodes in each set having an identification code unique to that set. The invention finds particular application in a network that includes a large population of user terminals that can communicate with any one of several data processing centers.

2. Background Art

A problem encountered with Electronic Funds Transfer at Point of Sale (EFTPOS) systems concerns the provision of keys which allow secure communication between terminals and bank host data processing centers. It is desirable that a symmetric encryption scheme be employed, such as the Data Encryption Algorithm (DEA) of the Data Encryption Standard (DES) and that use is made of a public key scheme to avoid the need for management of a large number of pairs of encryption keys.

Electronic funds transfer (EFT) is the name given to a system of directly debiting and crediting customer and service suppliers' accounts at the instant of confirmation of a transaction. The accounts are held at a bank, or credit card company's central processing system, which is connected to a dedicated network of retailers or service suppliers' data processing equipment. In this way no cash or check processing is required for the transaction.

Point of sale (POS) is the name given to retailers' data processing systems in which check-out or sale point tills are connected directly to a data processing system. Details of current transactions can then be used for stock control, updating customer accounts held locally and monitoring the retailers flow of business. A POS terminal can include the function required for an EFT terminal and be connected to an EFT network as well as the local retailers data processing system.

In a simple application each bank or credit card company has its own network and each customer of the bank has a credit card which can only be used on that network, such a network is described in European Patent Publication 32193.

European Patent Publication 32193 (IBM Corporation) describes a system in which each user and retailer has a cryptographic key number—retailer's key Kr and user's key Kp —which is stored together with the user's account number and retailer's business number in a data store at the host central processing unit (CPU). The retailer's key and the user key are used in the encryption of data sent between the retailer's transaction terminal and the host CPU. Obviously only users or customers with their identity numbers and encryption keys stored at the host CPU can make use of the system. As the number of users expands there is an optimum number beyond which the time taken to look up corresponding keys and identity numbers is unacceptable for on-line transaction processing.

The system described is only a single domain and does not involve using a personal identification number (PIN). Verification of the user's identity is at the host and without a PIN there is no bar to users using stolen cards for transactions.

European Patent Publication 18129 (Motorola Inc.) describes a method of providing security of data on a communication path. Privacy and security of a dial-up data communications network are provided by means of either a user or terminal identification code together with a primary cipher key. A list of valid identification codes and primary cipher code pairs is maintained at the central processing unit. Identification code and cipher key pairs, sent to the CPU are compared with the stored code pairs. A correct comparison is required before the cpu will accept encoded data sent from the terminal. All data sent over the network is ciphered to prevent unauthorized access using the the relevant user or terminal key.

The system described is a single domain in which all terminal keys (or user keys) must be known at a central host location. Hence, the ideas described in the patent do not address a multi-host environment and thus are not addressing the interchange problem either.

UK Patent Application 2,052,513A (Atalla Technovations) describes a method and apparatus which avoids the need for transmitting user-identification information such as a personal identification number (PIN) in the clear from station to station in a network such as described in the two European Patent Publications mentioned above. The PIN is encoded using a randomly generated number at a user station and the encoded PIN and the random number are sent to the processing station. At the processing station a second PIN having generic application is encoded using the received random number and the received encoded PIN and the generic encoded PIN are compared to determine whether the received PIN is valid.

This system does not use a personal key and as a consequence for a sufficiently cryptographically secure system, it is necessary to have a PIN with at least fourteen random characters (four bits each). This is a disadvantage from the human factor point of view as users will have difficulty remembering such a long string of characters and the chances of inputting unintentionally an incorrect string is very large. If a phrase, which a user can easily remember, is employed for a PIN, about 28 characters are required. Although remembering the information is not a problem, inputting such a long string of data still presents a human factors problem.

The EFT system made possible by the systems described in the above patent applications is limited to a single host CPU holding the accounts of all users, both retailers and customers.

An EFT system in which many card issuing organizations (banks, credit card companies, etc.) are connected and many hundreds of retail organizations are connected through switching nodes such as telephone exchanges, brings many more security problems.

PCT publication Wo 81/02655 (Marvin Sendrow) describes a multi-host, multi-user system in which the PIN is ciphered more than once at the entry terminal. The data required to validate and authorize the transactions is transmitted to a host computer which accesses from its stored data base the data that is required to decipher and validate the transaction, including the ciphered PIN. A secret terminal master key must be maintained at each terminal. A list of these master keys is also maintained at the host computer.

The maintaining of lists of terminal master keys at each of the card issuing organization's host computers is obviously a difficult task, in a complex system where the terminal keys are not controlled and, therefore, not known by the card issuing host.

European Patent Publication 55580 (Honeywell Information Systems) seeks to avoid the necessity of transmitting PIN information in the network by performing PIN verification at the entry point terminal. This is achieved by issuing each user with a card that has encoded in the magnetic stripe the bank identification (BIN), the user's account number (ACCN) and a PIN offset number. The PIN offset is calculated from the PIN, BIN and ACCN. The user enters the PIN at a keyboard attached to the terminal, which also reads the PIN offset, BIN and ACCN from the card. The terminal then re-calculates a PIN offset from the user's entered PIN, the BIN and ACCN. If the re-calculated PIN offset is the same as the PIN offset read from the card then verification of the PIN is assumed. This approach has the disadvantage in that the system is not involved in the validation and that knowing that the PIN offset is calculated from the PIN, the BIN and ACCN, anyone having knowledge of the process can manufacture fraudulent cards with valid PINS.

European patent application No. 82306989.3 (IBM) describes a method and apparatus for testing the validity of personal identification numbers (PIN) entered at a transaction terminal of an electronic funds transfer network in which the PIN is not directly transmitted through the network. The PIN and the personal account number (PAN) are used to derive an authorization parameter (DAP). A unique message is sent with the PAN to the host processor where the PAN is used to identify a valid authorization parameter (VAP). The VAP is used to encode the message and the result (a message authentication code MAC) transmitted back to the transaction terminal. The terminal generates a parallel derived message authentication code (DMAC) by using the DAP to encode the message. The DMAC and MAC are compared and the result of the comparison used to determine the validity of the PIN.

In such a system the generation of DAP as well as VAP is based on a short PIN only and is therefore cryptographically weak.

In any multi-domain communication network where each domain includes a data processor and in which cryptographically secure transmission takes place it is necessary to establish cross domain keys. A communication security system in which cross domain keys are generated and used is described in U.S. Pat. No. 4,227,253 (IBM). The patent describes a communication security system for data transmissions between different domains of a multiple domain communication network where each domain includes a host system and its associated resources of programs and communication terminals. The host systems and communication terminals include data security devices each having a master key which permits a variety of cryptographic operations to be performed. When a host system in one domain wishes to communicate with a host system in another domain, a common session key is established at both host systems to permit cryptographic operations to be performed. This is accomplished by using a mutually agreed upon cross-domain key known by both host systems and does not require each host system to reveal its master key to the other host system. The cross domain key is enciphered under a key encrypting key at the sending host system and under a different key encrypting key at the receiving host system. The sending host system creates an enciphered session key and together with the sending cross-domain key performs a transformation function to re-encipher the session key under the cross domain key for transmission to the receiving host system. At the receiving host system, the receiving host system using the cross domain key and received session key, performs a transformation function to re-encipher the received session key from encipherment under the cross domain key to encipherment under the receiving host system key. With the common session key now available in usable form at both host systems, a communication session is established and cryptographic operations can proceed between the two host systems.

Reference to the following publications are included as giving general background information in encryption techniques and terminology:

1. IBM Technical Disclosure Bulletin, Vol. 19, No. 11, Apr. 1977, p. 4241, "Terminal Master Key Security" by S. M. Matyas and C. H. Meyer.
2. IBM Technical Data Bulletin, Vol. 24, No. 1B, June 1981, pp. 561–565, "Application for Personal Key Crypto With Insecure Terminals" by R. E.-Lennon, S. M. Matyas, C. H. Meyer and R. E. Shuck;
3. IBM Technical Data Bulletin, Vol. 24, No. 7B, Dec. 1981, pp. 3906–3909 "Pin Protection/Verification For Electronic Funds Transfer" by R. E. Lennon, S. M. Matyas and C. H. Meyer;
4. IBM Technical Disclosure Bulletin, Vol. 24, No. 12, May 1982, pp. 6504–6509, "Personal Verification and Message Authentication Using Personal Keys" by R. E. Lennon, S. M. Matyas and C. H. Meyer;
5. IBM Technical Disclosure Bulletin, Vol. 25, No. 5, Oct. 1982, pp. 2358–2360, "Authentication With Stored KP and Dynamic PAC" by R. E. Lennon, S. M. Matyas and C. H. Meyer;

In an EFTPOS system retailers' terminals (nodes) are connected through a switched data network to a plurality of different banks' host data processing systems (nodes). The switched network includes intermediate processors (nodes) and each terminal and each host processor will have access to the network through an associated intermediate processor. There is a cryptographic key management problem between the end user nodes and the associated intermediate node but solutions to that are reasonably straight forward. The problem that the present invention addresses is to provide end-to-end security between communicating partners such that the intermediate nodes cannot derive the contents of selected secret fields within messages. This is particularly important in the case of Personal Identification Numbers (PINs) in a EFTPOS system.

The problem of providing end-to-end keys in a many to many network has exercised cryptographers for many years. A summary of other prior art may be found in "Cryptography" by Meyer and Matyas, published by Wiley-Interscience, 1982 and "Security for Computer Networks" by Davies and Price, published by Wiley, 1984.

In systems with intermediate nodes the keys used to encipher a PIN are composite keys, composed of two components:

A system component known to the end node and the intermediate node,

An end-to-end component which is not known to the intermediate processor.

In EFTPOS systems it is not feasible to manage separate keying relationships between each terminal and each host processor because of the extremely large number of such relationships, (one key for each host in each terminal and one key for each terminal in each host).

Draft PIN management standards require that the key used to encipher a PIN should take a different value for each successive encryption, however this aspect can be handled by the system component of a composite key, which can be changed following each encryption, (for example using the scheme proposed for the management of PIN encrypting keys in "Minimum Acceptable PIN Entry Device" Annex D of ISO TC68/SC2/WG6 document N52).

OBJECTS OF THE INVENTION

It is an object of the invention to provide a method and apparatus for use in deriving the end-to-end component which are also equally useful in the general case where static encryption keys are required.

It is another object of the invention to provide the key shared between the end points to be unique to the pair, that is an EFTPOS system the key should be unique between the terminal and the bank host processor.

SUMMARY OF THE INVENTION

According to the invention there is provided a method of encoding messages in a communication network in which a first set of nodes transmits and receives messages to and from a second set of nodes, each of the nodes in each set having an identification code unique to that set, the method including the steps of:

(a) deriving common cryptographic keys for each of the sets of nodes, (b) storing, at each node of the first set of nodes, the key common to the first set of nodes and a value derived (dv) from the encryption of the key common to the second set of nodes with the node identification code, (c) storing, at each node of the second set of nodes, the key common to the second set of nodes and a value derived (dv) from the encryption of the key common to the first set of nodes with the node identification code, and whenever a node of one set has a message to transmit to a node of the other set, (d) deriving a message encryption key from a combination of the destination node identification code encrypted by the one set common key and the stored derived value (dv), (e) transmitting to the destination node the originating node's identification code and the message encrypted under the derived message encryption key, and at the destination node, (f) deriving the message encryption key from a combination of the originating node's identification code encrypted by the other set common key and the stored derived value (dv), and (g) decoding the message.

According to a second aspect of the invention there is provided a communication network in which a first set of nodes transmits and receives messages to and from a second set of nodes, each of the nodes in each set having an identification code unique to that set, each node of the first set of nodes including:

storage means which stores a key common to the first set of nodes and a value derived (dv) from the encryption of a key common to the second set of nodes with the node identification code, data processing means operable, whenever the node has a message to transmit to a node of the second set, to derive a message encryption key from a combination of the destination node identification code encrypted by the one set common key and the stored derived value (dv), and means to transmit to the node of the second set the originating node's identification code and the message encrypted under the derived message encryption key, and at each node of the second set of nodes:

storage means which stores the key common to the second set of nodes and a value derived (dv) from the encryption of the key common to the first set of nodes with the node identification code, data processing means operable, whenever the node receives a message from a node of the second set, to derive a message encryption key from a combination of the destination node identification code encrypted by the one set common key and the stored derived value (dv), and to use the derived key to decode the message.

BRIEF DESCRIPTION OF THE FIGURES

In order that the invention may be fully understood a preferred embodiment thereof will now be described with reference to the accompanying drawings in which.

DESCRIPTION OF THE BEST MODE FOR CARRYING OUT THE INVENTION

Figure 1:
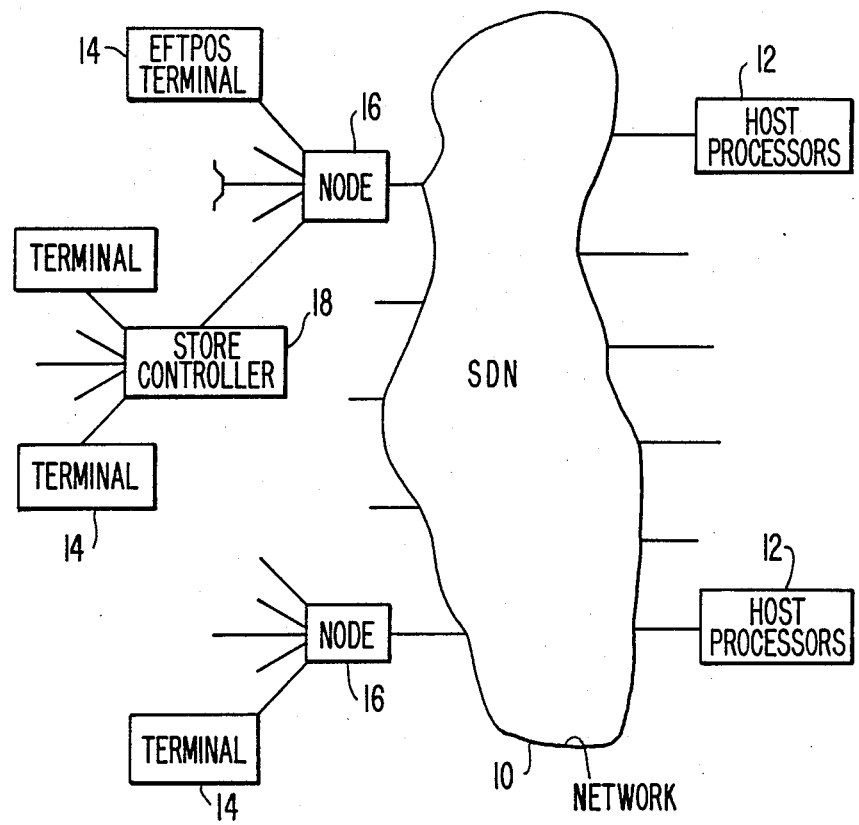
FIG. 1 illustrates in schematic form an EFTPOS network.
Figure 3:
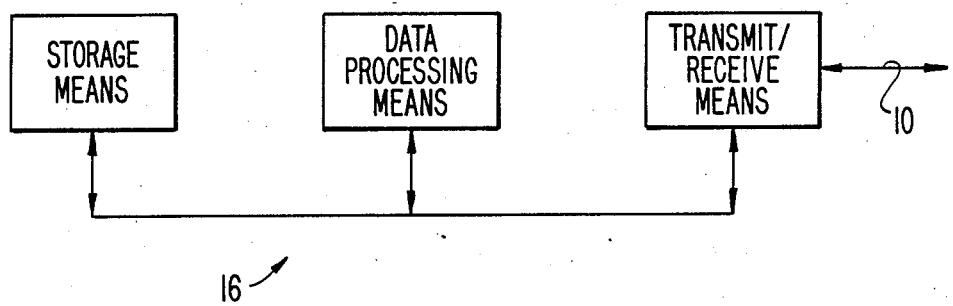
FIG. 3 shows the internal details of a node.

Referring now to FIG. 1 there is shown a network (SDN) 10 to which are connected a number of bank host processors 12 either directly or through associated network controllers. EFTPOS terminals 14 are either connected directly to network nodes 16 or through a store controller 18 which is in turn connected to a network node. The SDN contains many intermediate processors that control the routing functions necessary to establish communication between any one of the terminals, which may number in the hundreds of thousands, and the bank host processors, which may exceed a hundred. FIG. 3 shows an example node 16 which includes a storage means, a data processing means and a transmit/receive means coupled to network 10.

Terminals are added and subtracted from the system on a daily basis and it is clearly impractical for all the host processors to maintain separate end-to-end keys for each.

In the preferred embodiment of the present invention each terminal includes a security module which is tamper resistant to an appropriate degree.

The method of the invention will now be described generally:

Let the end-points be classified into Class 1 and Class 2 parties, for instance for an EFTPOS system let the terminals be Class 1 and the bank hosts be Class 2 end-points.

Let there be a trusted Key Generation Center (KGC).

The KGC generates and keeps secret two Base Keys, one for each class, these will be denoted KBT for terminals and KBH for bank hosts.

Let each end-point be assigned a unique, non-secret identification value denoted TID for terminals and HID for hosts, this must be unique within the class, but the same numbering scheme could be used within each class (i.e., it would not matter if there were a terminal with TID=1 and a host with HID=1).

The security module for each terminal is securely loaded with the following two values:

The value of the base key for terminals (KBT).

The value of its TID enciphered under the base key of the other class, denoted e KBH (TID).

It is probably that the KGC will also load the value of TID1 into the security module in a practical implementation.

The security module for each bank host is securely loaded with the following two values:

The value of the base key for bank hosts (KBH).

The value of its HID enciphered under the base key of the other class, denoted e KBT (HID).

To generate a key for use between a terminal with TID=TID1 and a hosts with HID =HID1, the following steps are required at the terminal.

Encipher the HID of the required host under the terminal base key (KBT), giving e KBT (HID1).

Exclusive-OR (bitwise modulo 2 addition) the value generated with the value of e KBH (TID1) which was loaded by the KGC.

Use the value KEY=e KBT (HID1) (+) e KBH (TID1) for encryption, or as the end-to-end component of a composite key.

This value is effectively unique to the pair TID1 and HID1 since only they can generate the two components. It is possible that the value KEY could be valid on other pairings, but this fact could not be predicted.

The message must include in clear the values of TID and HID of the parties involved, which act as the public components of the key.

The host, on receiving the message determines from the transmitted message that the originating party was TID1 and can then calculate the value of the enciphering key by the following procedure:

Encipher the value of TID1 under the base key for hosts giving the result e KBH (TID1).

Exclusive-OR (bitwise modulo 2 addition) the value generated with the value of e KBT (HID1) which was loaded by the KGC.

Use the value KEY=e KBH (TID1) (+) e KBT (HID1) for decryption, or as the end-to-end component of the composite key.

The values use to generate the keys (KBT, KBH, e KBH (TID,) ....) must be securely stored at the end-point and securely delivered from the generation center to the security module of the end-point.

The invention will now be described with reference to an implementation in a multi node network where there are many "terminal" end points and many "ultimate destination" end points. The minimum information is stored at these end points to enable a unique cryptographic key to be established between them, thus securing date on an end to end basis.

Figure 2:
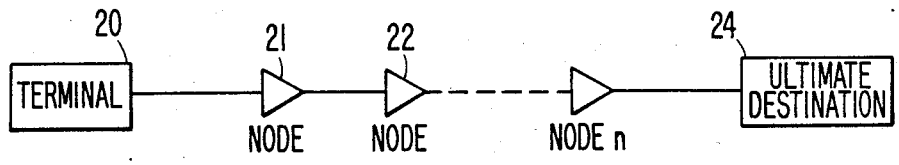
FIG. 2 illustrates a system where there are potentially multiple intermediate nodes through which a message may be passed.

The network is illustrated diagrammatically in FIG. 2 which shows a terminal 20, connected through node1 21, node 2 22, up to node n and an ultimate destination 24.

Before a transaction can take place the keys for the terminals (1st Group) and hosts (2nd Group) are generated. The terminal base key (TBK) is stored in all the terminals that are connected to the network and the host base key (HBK) is stored in all the host processors connected to the network.

Each terminal also has a terminal unique key which is formed by encrypting the terminal identity number (TID) using the host base key (HBK) giving EHBK,(-TID). This is also stored at the terminal. Terminals also have a Link Key (LK) which relates to the immediate transmission path between the terminal and its adjacent node in the network. Nodes similarly have Link Keys for the paths to and from terminals, adjacent nodes or adjacent hosts.

In this embodiment the processors perform the following encryptographic functions.

Function A. The encryption of Data (d) under a Key (k) using a one-way function giving e k (d).

Function B. A bit by bit modulus 2 addition, or Exclusive 0R function of each bit of two inputs. The function need not be symmetrical so the DES encryption algorithm can be used as an alternative.

Functions C D and F. A DES encipher function.

Function E. A DES decipherment function.

Function G. The encryption of data under a key using the DES algorithm or equivalent with the property that knowledge of e k (d) does not enable (k) to be determined in a cost effective way.

Function H. Similar to B but with reversed inputs.

Functions I and J. The reverse of F and C that is DES decipher algorithm.

The functions performed and the data required by the terminal 20 to initiate a message transmission are now described as a series of steps.

Step 1. The assembly of the data that is to be included in the message. This will include in a funds transfer request such items as the PIN, PAN and the amount of money involved in the transaction together with the destination information. The message is formatted and the fields requiring protection by encryption are identified.

Step 2. The data on a magnetic stripe on a card or equivalent is entered, this may include the users or customers PAN and the Ultimate Destination Identifier (UDID).

Step 3. In this step the UDID is formatted ready for encryption with the terminal base key (TBK).

Step 4. Function A is performed encrypting UDID using the key TBK to give (Etbk(UDID)

Step 5. Function B is performed on the output of step 4 and the stored terminal unique key Ehbk(TID) giving an ultimate destination unique value (Etbk(UDID).Ehbk(TID)).

Step 6. In this step the output of step 5 is used as the key to perform the function C on the sensitive information (PIN, PAN etc) formatted in Step 1. The output of Function C is the enciphered data that uses the unique "Pair" key (host-terminal) for protection. Note: If the communication is direct between the terminal and the ultimate destination then the output of Step 9 can be sent as part of the message without further processing. This is useful in a large variety of applications where the storage of a set of distinct keys is not appropriate (e.g. Smart Cards and Terminals as distinct sets or Dial-Up Terminals that communicate with multiple destination end points or Pay Television).

Step 7. The link key (LK) is used to encipher the output of Step 6 for transmission to the adjacent node (21) and the message is then transmitted using the normal terminal-node protocols.

At the Node.

Step 8. The message is received and using function E and the terminal-node link key (LK) it is deciphered.

Step 9. The deciphered message which is now the same as the output of Step 6 is re-enciphered using function F with the next node link key, and then forwarded to the next node.

Steps 8 and 9 are then repeated at each node in the transmission chain.

At the host or Ultimate Destination.

Step 10. The message is received and the terminal identification number, which is enciphered only under the next link key is used to a generate Ehbk(TID) using function G.

Step 11. The output of Step 10 (Ehbk(TID)) together with Etbk(UDID) are used as the input to function H which is the same as function B to produce the ultimate destination unique value.

Step 12. In this step the message received from the adjacent node is deciphered using function I and the next link key (NLK) to provide an output which includes the sensitive information (PIN/PAN) encoded under the ultimate destination unique value, i.e. the output of Step 5 and Step 11.

Step 13. Function J is used to decipher the sensitive information encoded under the ultimate destination unique value.

At this point the data generated at the terminal is now to the host processor and the transaction can be processed according to the data protected.

In this embodiment it has been shown that the sensitive data is not available at the intermediate nodes and is only available in clear at the terminal and host destination. The process is reversed for messages sent from the host to the terminal.

What is claimed is:

1. A method of encoding messages in a communication network in which a first set of nodes transmits and receives messages to and from a second set of nodes, each of the nodes in each set having an identification code unique, the method including the steps of:
    deriving a first common cryptographic key for said first set and a second common cryptographic key for said second set;
    storing, at each node of the first set of nodes, said first key common to the first set of nodes and a first value derived from the encryption of said second key common to the second set of nodes with a node identification code;
    storing, at each node of the second set of nodes, said second key common to the second set of nodes and a second value derived from the encryption of said first key common to the first set of nodes with a node identification code;
    and whenever a sender node of said first set has a message to transmit to a destination node of said second set;
    deriving a message encryption key from a combination of the destination node identification code encrypted by said first set common key and said first derived value;
    transmitting to the destination node the sending node's identification code and the message encrypted under the derived message encryption key; and at the destination node;
    deriving said message encryption key from a combination of the sending node's identification code encrypted by said second set common key and said second derived value; and
    decoding the message.

2. A method as claimed in claim 1, in which the network includes a set of intermediate nodes, and the transmission of messages sent between nodes of the first set and nodes of the second set includes the further steps of:
    storing at adjacent intermediate nodes in the network, common encryption keys; and
    encrypting messages that are sent between adjacent intermediate nodes using sequence variants of the common encryption key, so that no two sequential messages are encrypted under the same variant of the common encryption key.

3. A method as claimed in claim 2 in which said combination is by a logical Exclusive OR operation.

4. A method as claimed in claim 1 in which said combination is by a logical Exclusive OR operation.

5. A communication network in which a first set of nodes transmits and receives messages to and from a second set of nodes, each of the nodes in each set having an identification code;
    each node of the first set of nodes including: storage means which stores a first key common to the first set of nodes and a first value derived from the encryption of a second key common to the second set of nodes with a node identification code;
    data processing means operable, whenever the node is a sending node and has a message to transmit to a destination node of the second set, to derive a message encryption key from a combination of a destination node identification code encrypted by said first set common key and said first derived value;
    and means to transmit to the destination node of the second set the sending node's identification code and the message encrypted under the derived message encryption key; and
    at each node of the second set of nodes:
    storage means which stores said second key common to the second set of nodes and a second value derived from the encryption of said first key common to the first set of nodes with a node identification code;
    data processing means operable, whenever the node is a destination node and receives a message from a sending node of the first set, to derive a message encryption key from a combination of said sending node identification code encrypted by said second set common key and said second derived value, and to use the derived key to decode the message.

6. A communication network as claimed in claim 5 in which the data processing means in each node of both sets of nodes is operable to both encrypt outgoing messages and to decrypt incoming messages.

7. A communication network as claimed in claim 6 in which the nodes of the first set are end user terminals suitable for use in an electronic funds transfer transaction and the nodes of the second set are host data processing systems.

8. A communication network as claimed in claim 5 in which the nodes of the first set are end user terminals suitable for use in an electronic funds transfer transaction and the nodes of the second set are host data processing systems.

9. A method for encoding messages in a communications network including a first node with a first ID and a second node with a second ID in a first set coupled over said network to a second set including a third node with a third ID and a fourth node with a fourth ID, comprising the steps of:

storing a first base key at said first and second nodes and storing a second base key at said third and fourth nodes;

deriving a first value of said first ID enciphered under said second base key and storing it at said first node;

deriving a second value of said second ID enciphered under said second base key and storing it at said second node;

deriving a third value of said third ID enciphered under said first base key and storing it at said third node;

deriving a fourth value of said fourth ID enciphered under said first base key and storing it at said fourth node;

generating a communications key for transmission of messages from said first node to said third node by enciphering said third ID under said first base key and logically combining the result thereof with said first value;

generating said communications key for receiving messages transmitted from said first node to said third node by enciphering said first ID under said second base key and logically combining the result thereof with said third value;

enciphering a message under said communications key at said first node for transmission over said network to said third node and deciphering said message under said communications key at said third node.

10. The method of claim 9, wherein said logically combining in said generating steps is the logical exclusive OR operation.

11. The method of claim 9, in which said second set in said communications network further includes a fifth node coupled to said third node, said third node serving as an intermediate node between said fifth node and said network, comprising the steps of:

storing a link key at said third node and at said fifth node;

enciphering said message under a variant of said link key at said third node for transmission to said fifth node;

deciphering said message under said variant of said link key at said fifth node.

12. The method of claim 11, in which said variant of said link key is a time variant.

13. The method of claim 11, in which said variant of said link key is a sequence variant.

* * * * *